(12) United States Patent
Dorr

(10) Patent No.: US 7,104,576 B1
(45) Date of Patent: Sep. 12, 2006

(54) WEEDING SHOVEL WITH FOOTSTEP

(76) Inventor: Alan Dorr, 983 Myrtle Ave., Chico, CA (US) 95926

( * ) Notice: Subject to any disclaimer, the term of this patent is extended or adjusted under 35 U.S.C. 154(b) by 0 days.

(21) Appl. No.: 11/045,765

(22) Filed: Jan. 27, 2005

(51) Int. Cl.
*A01B 1/00* (2006.01)
(52) U.S. Cl. ....................................................... 294/60
(58) Field of Classification Search ................. 294/49, 294/59, 60, 57; 76/113; 254/131.5, 132; 403/344, 354, 270–272; 15/257.1; D8/88, D8/89, 10; 172/376, 380, 381
See application file for complete search history.

(56) References Cited

U.S. PATENT DOCUMENTS

| 27,437 | A | 3/1860 | Fasig |
|---|---|---|---|
| 96,740 | A | 11/1869 | Springstead |
| 118,196 | A | 8/1871 | Clark |
| 249,665 | A | 11/1881 | Pettebone |
| 298,926 | A | 5/1884 | Watson |
| 332,132 | A | 12/1885 | Anthony |
| 449,568 | A | 3/1891 | Omlor |
| 536,230 | A | 3/1895 | Page |
| 678,373 | A | 7/1901 | Blaser |
| 772,097 | A | 10/1904 | Hayes |
| 809,840 | A | 1/1906 | Peisker |
| 810,488 | A | 1/1906 | Jarvis |
| 952,140 | A | 3/1910 | Westerberg |
| 1,003,808 | A | 9/1911 | Sanderson |
| 1,058,819 | A | 4/1913 | Walsh |
| 1,097,313 | A | 5/1914 | Gregory |
| 1,138,018 | A | 5/1915 | Siedow |
| 1,166,427 | A | 1/1916 | Bradley |
| 1,182,918 | A | 5/1916 | McQuaide |
| 1,198,930 | A | 9/1916 | Krentel |
| 1,278,680 | A | 9/1918 | Klaffert |
| 1,305,079 | A | 5/1919 | Eaton et al. |
| 1,335,848 | A | 4/1920 | Miller |
| 1,423,775 | A | 7/1922 | Mundt |
| 1,531,751 | A | 3/1925 | Mena |
| 1,658,963 | A | 2/1928 | Bergquist |
| 1,687,986 | A | 10/1928 | Miller |
| 1,730,759 | A | 10/1929 | Crane |
| 1,908,735 | A | 5/1933 | Donaldson |
| 2,006,672 | A | 7/1935 | Combs |
| 2,192,827 | A | 3/1940 | Dahl |
| 2,221,192 | A | 11/1940 | Juhl |
| 2,247,958 | A | 7/1941 | Maxcy |
| 2,487,518 | A | 11/1949 | Brooke |
| 2,716,538 | A * | 8/1955 | Arrowood .................... 294/49 |

(Continued)

FOREIGN PATENT DOCUMENTS

GB  2232047  * 12/1990

(Continued)

*Primary Examiner*—Eileen D. Lillis
*Assistant Examiner*—Paul T. Chin
(74) *Attorney, Agent, or Firm*—John P. O'Banion

(57) ABSTRACT

A shovel, particularly useful for weeding soil, has a tubular socket with a proximal end having an opening configured to receive a distal end of an elongate handle. The socket has a slot configured to receive a proximal end of a blade at its distal end, the slot. The slot is further configured to receive the blade such that the proximal end of the blade is positioned continuously through the slot without interruption. The shovel further includes a foot step having platform for accommodating a person's foot at the proximal end of the blade. The footstep has a support integral with the platform such that the support contacts the bottom surface of the blade at a location distal from the proximal end to provide support to the blade and the platform.

11 Claims, 6 Drawing Sheets

U.S. PATENT DOCUMENTS

| | | | |
|---|---|---|---|
| 2,723,453 A | 11/1955 | Espitallier | |
| 3,020,077 A | 2/1962 | Rokos | |
| 3,782,770 A | 1/1974 | Lee | |
| 3,865,348 A | 2/1975 | Close | |
| 3,868,775 A | 3/1975 | Anderson | |
| 4,135,751 A | 1/1979 | Gederos | |
| 4,281,866 A | 8/1981 | Atcheson | |
| D272,799 S | 2/1984 | Pluss | |
| 4,618,003 A | 10/1986 | Hostetter | |
| 4,718,708 A | 1/1988 | Zacuto | |
| D300,714 S | 4/1989 | Skibell | |
| 4,819,736 A | 4/1989 | Hedgepeth | |
| 4,904,011 A | 2/1990 | Hawk | |
| 4,905,768 A | 3/1990 | Lorenz | |
| 4,916,984 A | 4/1990 | Albert | |
| 5,060,997 A | 10/1991 | Plecki | |
| 5,085,478 A | 2/1992 | Seifert et al. | |
| D326,212 S | 5/1992 | Mingrino | |
| 5,109,930 A | 5/1992 | Napier | |
| 5,209,534 A | 5/1993 | Crenshaw et al. | |
| D343,102 S * | 1/1994 | Tanner | D8/10 |
| 5,330,010 A | 7/1994 | Smotherman | |
| 5,337,442 A * | 8/1994 | Stewart | 15/236.01 |
| D351,538 S * | 10/1994 | Gatewood | D8/9 |
| 5,360,071 A * | 11/1994 | Bergendorf | 294/55.5 |
| 5,383,696 A | 1/1995 | Speier | |
| D362,164 S * | 9/1995 | Butcher | D8/14 |
| 5,503,445 A | 4/1996 | Fontaine | |
| 5,520,429 A | 5/1996 | Gregory | |
| 5,529,130 A | 6/1996 | Suk | |
| 5,533,578 A | 7/1996 | Powell | |
| 5,669,649 A | 9/1997 | Metalf | |
| 5,887,921 A | 3/1999 | Rapoport et al. | |
| D407,955 S | 4/1999 | Bierman | |
| D435,406 S | 12/2000 | Alexander et al. | |
| 6,170,893 B1 | 1/2001 | Parker | |
| D437,532 S | 2/2001 | Petruzzzli | |
| 6,257,346 B1 | 7/2001 | Schofield et al. | |
| 6,338,511 B1 | 1/2002 | Douglas et al. | |
| 6,419,290 B1 | 7/2002 | Grayson, II et al. | |
| D462,244 S | 9/2002 | Woods | |
| 6,464,273 B1 | 10/2002 | Grayson, II et al. | |
| D474,082 S | 5/2003 | Leiser | |
| D477,193 S | 7/2003 | Atnip et al. | |

FOREIGN PATENT DOCUMENTS

| | | | |
|---|---|---|---|
| WO | WO 00/16604 | * | 3/2000 |

* cited by examiner

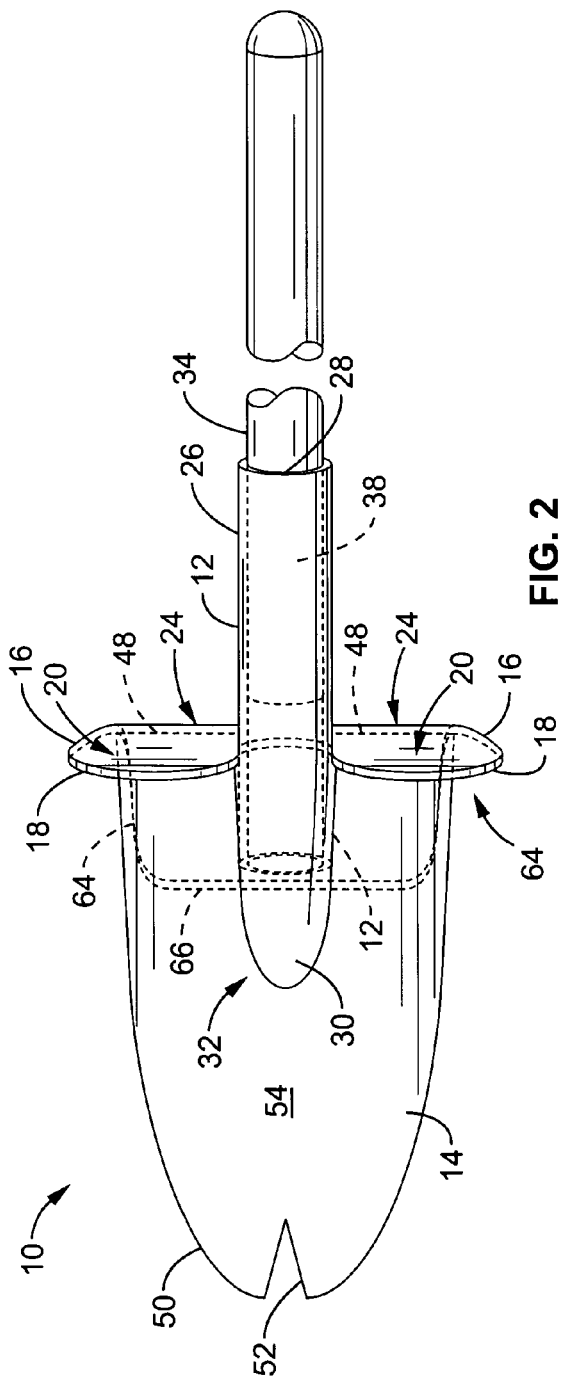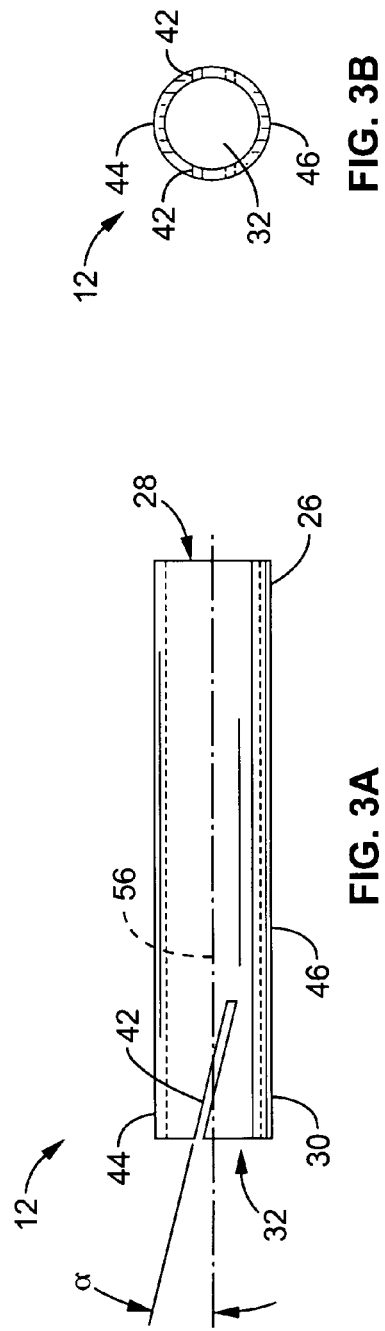

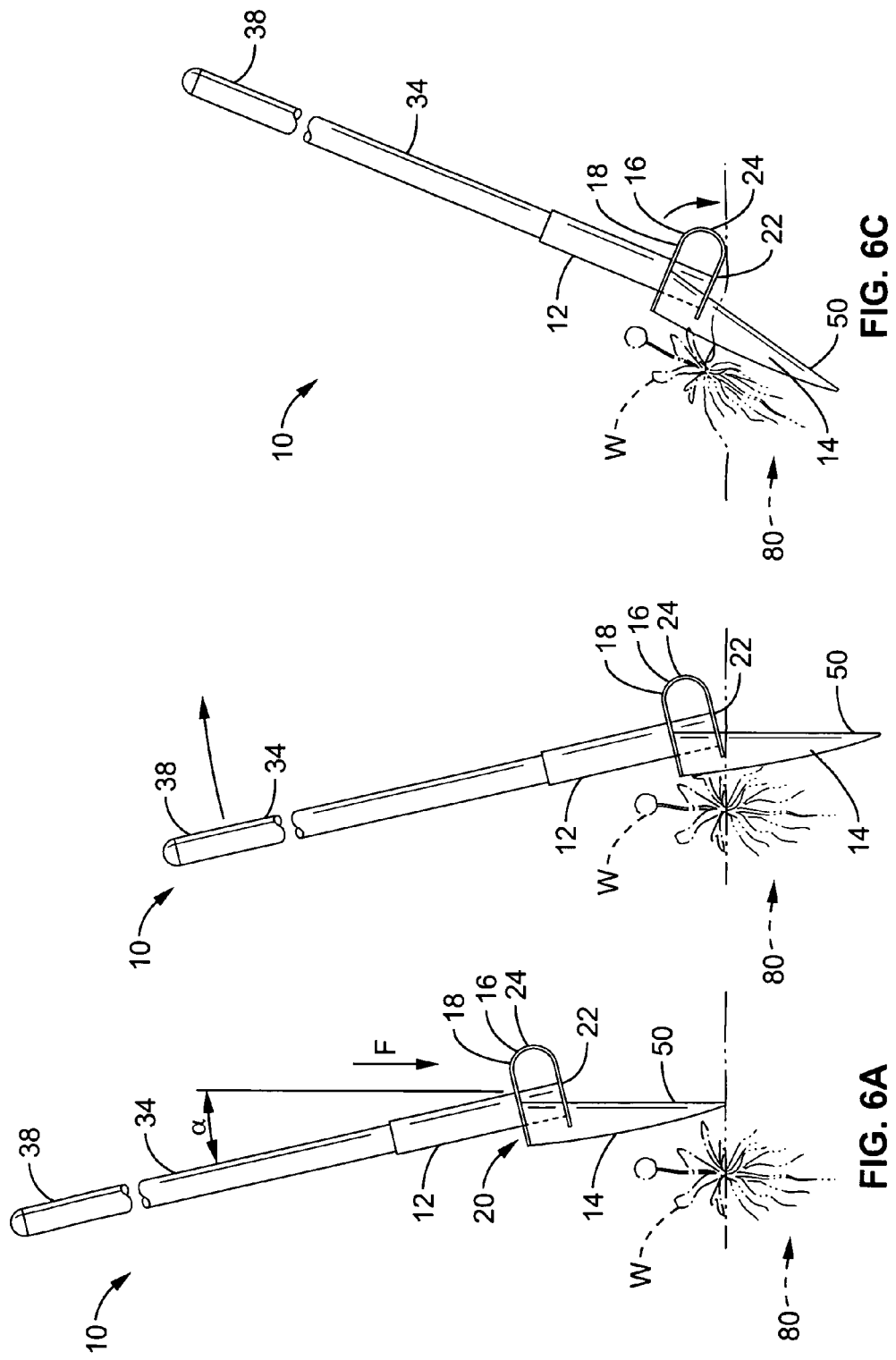

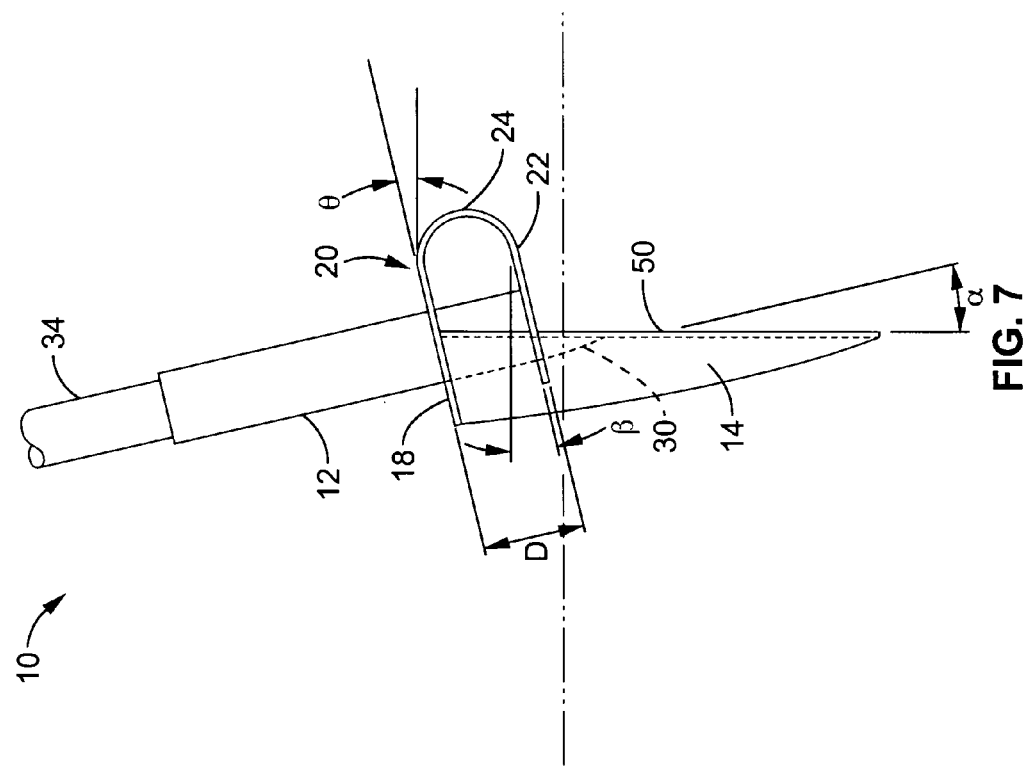

WEEDING SHOVEL WITH FOOTSTEP

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to shovels, and more particularly to a weeding shovel with an improved footplate for added stability and leverage.

2. Description of Related Art

Implements, such as shovels or spades, generally include a work engaging blade, an elongated handle for manipulating the blade and a socket which joins the handle to the blade. Because these shovels are typically used for pulling weeds or transferring or loosening relatively heavy material, such as dirt or similar material, by taking advantage of the leverage provided by the elongated handle, considerable stress is applied to the area where the handle and socket interface with the work engaging blade. This often leads to the blade being subjected to sufficient stress to either deform or break. Such a deformation or breakage can also in part result from metal fatigue caused by repeated stress over a long period of time. Typical implements currently used in the art are formed from a single sheet of material which is pressed or stamped into the required form. Such single sheet configurations frequently fail at the blade/handle interface, as there is insufficient support to handle the associated loads.

Typical implements often have a formed blade with a portion of the top of the blade is reinforced or folded over to provide a reinforced portion to which a foot is applied to force the shovel blade into the ground. If the ground is compacted or a clay soil, it is difficult to force the blade into the ground and the narrow reinforced folded portion may apply excess pressure on the foot through the sole of the shoe.

Accordingly, an object of the present invention to provide a shovel for weeding and other high-leverage activities, with increased support in the blade/handle interface region most directly affected by stress and most likely to undergo fracturing or deformation.

It is a further object of the present invention to provide a footstep that increases the platform for the user to apply foot pressure to the blade, and is supported by the shovel blade. At least some of these objectives will be met in the embodiments described herein.

BRIEF SUMMARY OF THE INVENTION

An aspect of the invention is a shovel having a tubular socket with a distal end and a proximal end, wherein the proximal end of the socket has an opening configured to receive a distal end of an elongate handle. The socket has a slot at its distal end that is configured to receive a proximal end of a blade having an upper surface and a bottom surface. The slot is further configured to receive the blade such that the proximal end of the blade is positioned continuously through the slot without interruption. The shovel further has a foot step having platform at the proximal end of the blade for accommodating a person's foot. The footstep also has a support integral with the platform, wherein the support contacts the bottom surface of the blade at a location distal from the proximal end to provide support to the blade and the platform.

In a preferred mode of the present aspect, the slot is oriented at an angle with respect to a central axis of the socket. The slot is preferably oriented at an angle in the range of 10 degrees to 25 degrees from a central axis of the socket, and more preferably between 15 degrees to 20 degrees from a central axis of the socket.

In another preferred mode, the platform has a planar surface relatively normal to the central axis of the socket. Alternatively, the platform may be oriented normal to the blade. Ideally, the platform is integrated with the support via a curvilinear bottom section, such that the curvilinear bottom section is configured to generate leverage between the blade and the footstep when the blade is inserted into a region of soil.

In a preferred embodiment, the support is substantially parallel to the platform. Alternatively, the support may be at an angle with the platform. The platform may extend laterally past the proximal end of the blade, especially where the blade has a narrow width. Preferably, the support covers the distal opening in the socket In a preferred embodiment, the slot emanates at a top region of the distal end of the socket such that a distal opening in the socket predominantly adjacent to the bottom surface of the blade.

In another preferred embodiment, the bottom surface of the blade is laterally convex to produce a depression in the upper surface and the support is cupped at its upper end to cradle the bottom surface of the blade.

In a preferred embodiment wherein the shovel is configured as a weeding shovel, the blade has a distal end terminating at a bifurcated tip. The blade has a length significantly larger than the width. The blade also has an arcuate profile to promote entry of the blade into a region of soil.

In another aspect of the present invention, a shovel has a tubular socket having a distal end and a proximal end, the proximal end having an opening configured to receive a distal end of an elongate handle, wherein the distal end of the socket configured to receive a proximal end of a blade having an upper surface and a bottom surface. The shovel further includes a foot step having platform for accommodating a person's foot located at the proximal end of the blade. The footstep also has a support integral with the platform via a curvilinear bottom section, wherein the support contacts the bottom surface of the blade at a location distal from the proximal end of the blade to provide support to the blade and the platform;

In a preferred mode of the present aspect, the curvilinear bottom section is configured to generate leverage between the blade and the footstep when the blade is inserted into a region of soil. In one embodiment, the platform has a planar surface relatively normal to a central axis of the socket. Alternatively, the platform may have a planar surface relatively normal to the blade. When configured as a weeding shovel, the platform extends laterally past the proximal end of the blade.

In a further of the invention, a method is disclosed for weeding a region of ground soil using the shovel of the previously described aspect above. The method includes placing the distal tip of the blade at the soil with the blade oriented substantially perpendicular to the soil, stepping on the footstep to apply pressure to the platform sufficient to drive the blade a desired distance into the soil, pulling on the handle to rotate the shovel until the curvilinear bottom section of the footstep contacts the ground; and pivoting the shovel blade about the curvilinear bottom section to separate a section of soil from the ground.

Generally, the pressure applied at the platform is distributed into the bottom surface of the shovel blade. Additionally, wherein forces generated on the socket by pulling on the handle and pivoting the shovel blade are born by the bottom surface of the shovel blade.

In one mode of the present aspect, the shovel blade is oriented at an angle with respect to the shaft such that placing the distal tip of the blade at the soil comprises orienting the blade substantially perpendicular to the soil with the handle directed away from the user. This orientation of the blade with respect to the socket allows for a greater range of motion while rotating the shovel.

In a further aspect a shovel comprises a blade having an upper surface and a bottom surface, means for receiving a distal end of an elongate handle, wherein the receiving means coupled to a proximal end of the blade; The shovel also has a means for providing a platform for accommodating a person's foot at the proximal end of the blade. A support is integrated with said platform means such that the support contacts the bottom surface of the blade at a location distal from the proximal end of the blade to provide support to the blade and the platform. The platform means and support also provide a fulcrum means for generating leverage between the blade and the handle when the blade is inserted into a region of soil.

Generally, the fulcrum means comprises a curvilinear bottom section connecting the platform means and the support. The platform means may provide a planar surface perpendicular to a central axis of the receiving means, or perpendicular to the blade.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 2 illustrates the top surface of the blade of the shovel shown in FIG. 1.

FIG. 3A is a side view of an exemplary socket in accordance with the shovel shown in FIG. 1.

FIG. 3B is a front view of the socket of FIG. 3A.

FIGS. 6A–C illustrate a method of using the weeding shovel of the present invention.

FIG. 7 shows the platform and support of the footstep in accordance with the present invention.

DETAILED DESCRIPTION OF THE INVENTION

Referring more specifically to the drawings, for illustrative purposes the present invention is embodied in the apparatus generally shown in FIG. 1 through FIG. 7. It will be appreciated that the apparatus may vary as to configuration and as to details of the parts, and that the method may vary as to the specific steps and sequence, without departing from the basic concepts as disclosed herein.

Figure 1:
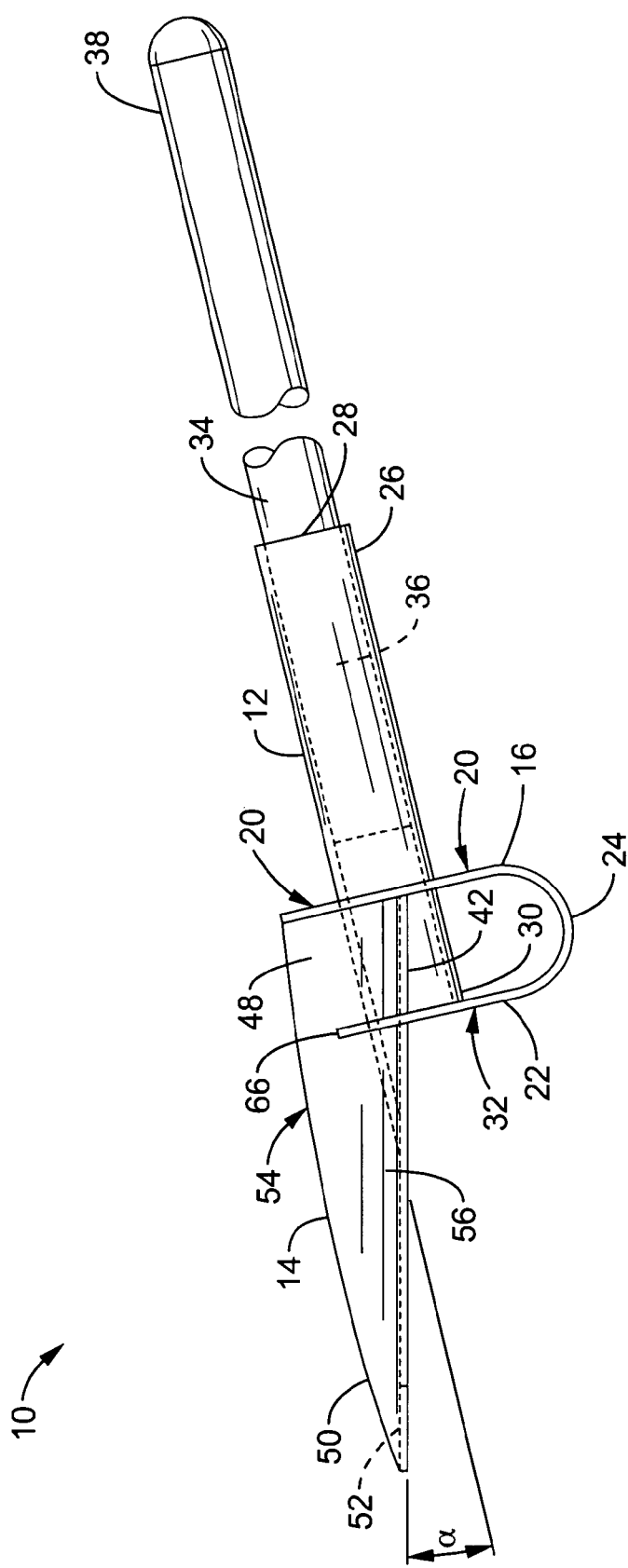
FIG. 1 is a side view of a weeding shovel in accordance with the present invention.

Referring to FIG. 1, a shovel 10 is illustrated in accordance with the present invention. Shovel 10, as illustrated in FIGS. 1 through 4, is particularly suited and configured for weeding soil. Shovel 10 comprises of a tubular socket 12 having a proximal end 26 with a proximal opening 28 sized to receive distal end 36 of handle 34. The handle 34 may be retained inside socket either by tapering the distal end 36 of the handle 34, or by a through hole in the socket and screw or cotter pin (not shown).

As illustrated in further detail in FIGS. 3A and 3B, the distal end 30 of the socket 12 has a slot 42 sized to receive proximal end 48 of shovel blade 14. The slot is oriented at an angle α with respect to the central axis 56 of the socket. Angle α may vary, but generally ranges from 10–25 degrees, and is more preferably in the range from 15–20 degrees. The offset angle the slot, as opposed to the slot oriented in-line with the socket axis, provides additional range of motion for rotating the shovel blade when implanted in the ground, as shown in FIGS. 6A through 6C and described in further detail below.

The slot preferably emanates at the distal opening 32 toward the top side 44 of the socket 12. The slot 41 continues in a straight line through both walls of the socket 12 at the angle α in relation to the socket axis 56 toward the bottom side 46 of the socket.

As shown in FIGS. 1 and 2, the proximal end 48 of the blade 14 is inserted into and down the length of slot 42. Thus, the blade 14 passes uninterrupted through the socket 12. The blade may then be welded to the socket at either or both the upper surface 54 or lower surface 56 of the blade 14 where it intersects the socket 12. This construction provides a rigid interface between the blade 14 and the socket 12 so that torques or other loading are evenly dissipated between the socket 12 and the blade 14. This provides a greatly improved strength over prior art shovels which have a sheet of metal at the blade interface.

Referring now to FIGS. 1 and 2, the weeding shovel 10 further comprises footstep 16 comprising an integrated platform 18 and support 22. The platform 18 is positioned around the socket 12 at the proximal end 48 of the blade 14. The footstep 16 allows for placement of the user's foot on a stable platform so that pressure may be applied to the shovel blade 14 to drive the blade into the ground, particularly where the ground comprises compacted or hard soil or rocks. This relieves pressure off of the user's hands and/or arms, which would otherwise have to inefficiently generate the force required to overcome resistance by the soil.

The platform 18 of footstep 16 has an upper surface 20 that is substantially perpendicular to the socket axis 56. Alternatively, the platform 18 may be positioned such that the platform is perpendicular to the blade 14, or some angle in between.

Figure 4A:
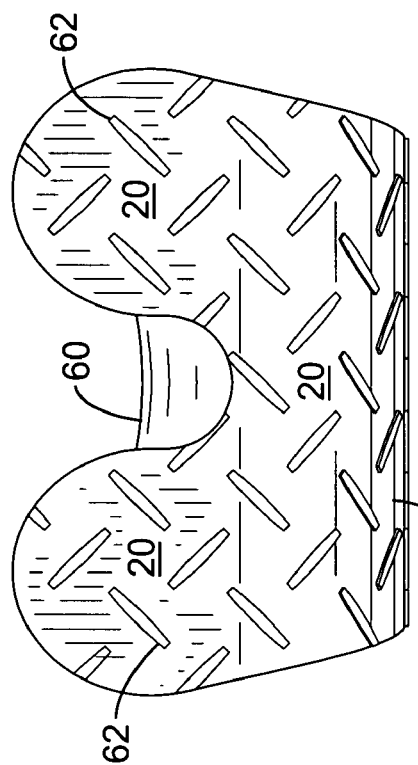
FIG. 4A illustrates the platform surface of a footstep in accordance with the shovel shown in FIG. 1.

Support 22 is preferably integrated with the platform 18 via curvilinear section 24. As shown in FIG. 1, the support 22 and platform 18 may be substantially parallel to form a u-shaped cross section. Referring to FIG. 4A, support 22 has a cupped upper surface 60 that is curved to match the convex bottom surface 56 of the blade 14. For extra support, the cupped upper surface 60 of the support may be welded to the bottom surface 56 of the blade 14. Thus, the support not 14 only stabilizes the platform 18 from rotation about or separation from the socket 12 and blade 14, but also increases the strength of the joint created by the interface of the blade 14 and the socket 12. The support 22 may also be distanced from the platform 18 such that the support seals off the distal end 30 and opening 32 of the socket 12.

The platform 18 has a depression 62 that allows the socket 12 to pass through to meet up with the support 60. Depression 62 allows the platform to extend in front of and over the front face 54 of the blade 14 to create a larger surface to place the user's foot. The depression is preferably curved at the bottom to match the outer surface of the socket 12.

Figure 4B:
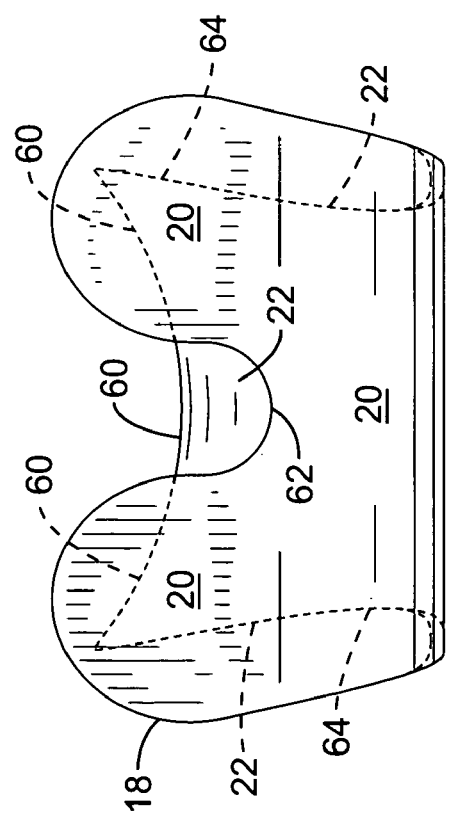
FIG. 4B is shows the footstep of FIG. 4A.

As shown in FIG. 4B, platform surface 20 may be roughened with surface pattern 62 to provide extra traction for the user's foot while applying pressure to the footpad. Pattern 62 may be protrusions, slots, or striations in the surface 20 and platform 18, or an additional abrasive material deposited on the platform 18 to increase the coefficient of friction of the surface 20.

Referring further to FIG. 2, the platform 18 may extend laterally outward from the socket past the blade 14. This is particularly useful when the width of the blade 14 is smaller than the length, as shown in FIG. 2. For weeding type applications, the blade 14 preferably has a narrow and arcuate profile such that the blade forms a less blunt tip or distal end 50. This allows for the blade to be implanted into hard or impacted soil with less resistance and correspondingly less foot or hand pressure. In such a configuration, the width of the shovel blade 14 on either side of the socket 12 may be smaller than the width of a typical user's shoe. Thus, the platform 18 extends laterally past the width of the blade 14 to maintain a sufficient platform. The support 22 can either have a step (not shown) or a curve inward profile 64 to meet up with the narrower blade surface, as partially illustrated in FIG. 2 and by dashed lines in FIG. 4A.

To further facilitate removal of weeds from the soil, the distal end 50 may have a bifurcated tip 52, as illustrated in FIG. 2. This configuration allows for the blade 14 to be positioned around the shaft of a weed lift and de-root the weed from the soil.

Figure 5:
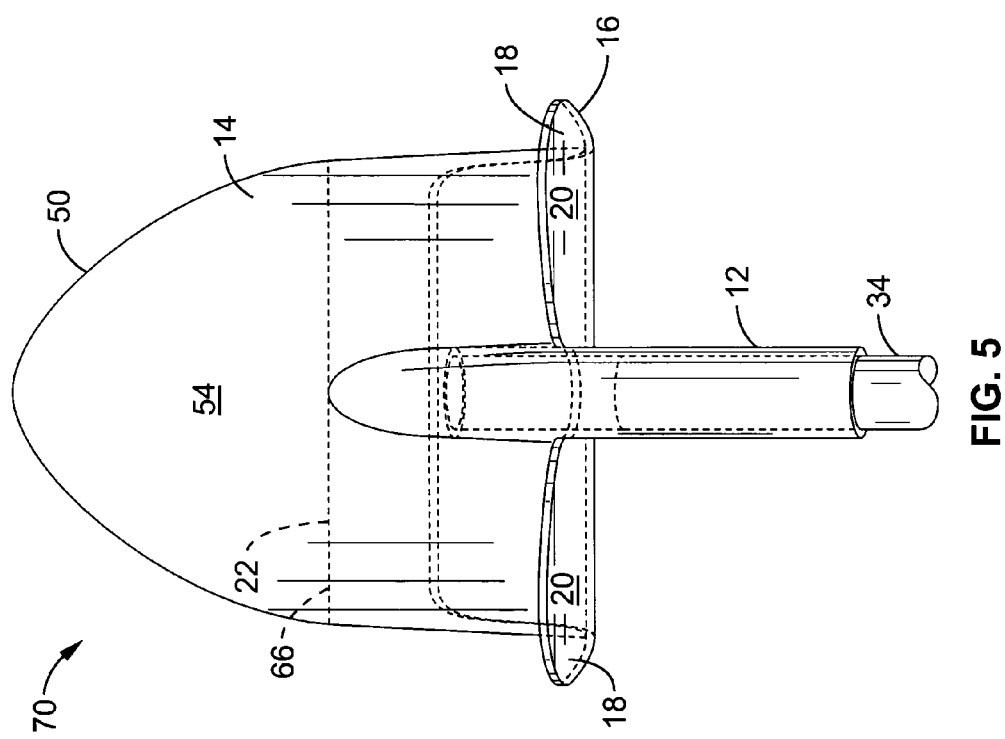
FIG. 5 illustrates an alternative shovel blade in accordance with the present invention.

Alternatively, shovel 70 may have a blade shaped accordingly to allow for removal or placement of soil, as shown in FIG. 5. The distal tip 50 of the blade 14 may be relatively blunt, or even rectangular (not shown), with a substantially larger width for carrying soil, rocks, aggregate or other materials. In this configuration, the platform 18 of the footstep 16 extends to the edge of the blade 14 width. For extra wide blades, the platform 18 may laterally stop short of the blade.

FIGS. 6A–6B illustrate the shovel 10 being used in accordance with the present invention to remove a weed or other plant from the ground. The shovel blade 14 is first positioned at the soil surface generally perpendicular to the ground 80, as shown in FIG. 6A. Because of the orientation of the shaft and blade at angle $\alpha$, the handle 34 will be oriented away from the user by $90°+\alpha$ (assuming perpendicular placement of the blade). This has the effect of increasing the range of motion for rotation of the shovel blade without the user having to step away from the shovel. With the shovel oriented properly, the user may then drive the blade 14 into the ground by applying foot pressure at the foot, as shown in FIG. 6B. The shovel blade may then be rotated toward the user by pulling on the handle 34. Further rotation is facilitated as the bottom surface 24 of the footstep 16 engages the ground, as illustrated in FIG. 6C. Here, the curvilinear surface 24 facilitates rotation, acting as a fulcrum to generate additional leverage to lift the ground and uproot the weed or plant.

Referring now to FIG. 7, it will be appreciated that the footstep may be varied in configuration to accommodate different needs. For example, the support 22 may be angled out of parallel with the platform 18 by angle $\beta$. For example, when the support 22 is angled toward the platform 20 by an angle $\beta=\alpha$ the support will engage generally flush to the ground such that any pulling of the handle is immediately facilitated by the fulcrum effect of bottom surface 24. In this configuration, distance D may be spaced so that blade 14 and socket 12 have sufficient material to engage each other. The distal end 30 of the socket 12 may also be beveled to match the angle $\beta$ for flush contact with the support 22.

Alternatively, support 22 may be oriented away from platform 18 so that the support engages the shovel blade 14 closer to the distal end of the blade. The socket distal end 30 may be correspondingly beveled to have flush contact with the support 22.

The platform 18 may also be configured at a non-orthogonal orientation with the socket 12. For example where the platform 18 is oriented at angle $\theta=\alpha$, the platform 18 will have a parallel orientation with the ground for improved footing. Correspondingly, the platform 18 and support 22 may be configure to be parallel so that that $\beta=\theta=\alpha$, with both the platform 18 and support 22 parallel to the ground when the blade is inserted perpendicular.

The shovels 10 and 70 may be sized accordingly to efficiently meet the task at hand. By way of example and without limitation, an exemplary weeding shovel 10 may have a 50 in. handle 34 for increased leverage. The blade 14 may be 6 in. in length by 3 in. in width, and be connected to a 5 in long socket 12. Distance D between the platform 18 and support 22 may be 1 in. or more. Correspondingly, shovel 70 may have a shorter handle 34 for better control.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A shovel, comprising:
   a tubular socket having a distal end and a proximal end, the proximal end having an opening configured to receive a distal end of an elongate handle;
   the socket having a slot at its distal end, the slot passing through the socket at two separate points along a perimeter of the socket;
   the slot configured to receive a proximal end of a blade;
   the blade having an upper surface and a bottom surface;
   wherein the slot is further configured to receive the blade such that the proximal end of the blade is positioned in the slot continuously through the slot without interruption of the blade; and
   a foot step having a platform for accommodating a person's foot;
   the platform located at the proximal end of the blade;
   the footstep also comprising a support integral with the platform;
   wherein the support contacts the bottom surface of the blade at a location distal from the proximal end to provide support to the blade and the platform;
   wherein the slot is oriented at an angle with respect to a central axis of the socket;
   wherein the platform has a planar surface relatively normal to the central axis of the socket;
   wherein the platform is integrated with the support via a curvilinear bottom section;
   wherein the curvilinear bottom section is configured to generate leverage between the blade and the footstep when the blade is inserted into a region of soil;
   wherein said slot emanates at a top region of the distal end of the socket such that a distal opening in the socket is predominantly adjacent to the bottom surface of the blade; and
   wherein the support covers the distal opening in the socket.

2. A shovel as recited in claim 1, wherein the support is substantially parallel to the platform.

3. A shovel as recited in claim 1, wherein the platform extends laterally past the proximal end of the blade.

4. A shovel, comprising:
   a tubular socket having a distal end and a proximal end, the proximal end having an opening configured to receive a distal end of an elongate handle;
   the socket having a slot at its distal end, the slot passing through the socket at two separate points along a perimeter of the socket;
   the slot configured to receive a proximal end of a blade;
   the blade having an upper surface and a bottom surface;
   wherein the slot is further configured to receive the blade such that the proximal end of the blade is positioned in the slot continuously through the slot without interruption of the blade; and
   a foot step having a platform for accommodating a person's foot;
   the platform located at the proximal end of the blade;
   the footstep also comprising a support integral with the platform;
   wherein the support contacts the bottom surface of the blade at a location distal from the proximal end to provide support to the blade and the platform;
   wherein the slot is oriented at an angle with respect to a central axis of the socket;
   wherein the platform has a planar surface relatively normal to the central axis of the socket;
   wherein the platform is integrated with the support via a curvilinear bottom section;
   wherein the curvilinear bottom section is configured to generate leverage between the blade and the footstep when the blade is inserted into a region of soil;
   wherein the bottom surface of the blade is laterally convex to produce a depression in the upper surface; and
   wherein the support is cupped at its upper end to cradle the bottom surface of the blade.

5. A shovel, comprising:
   a tubular socket having a distal end and a proximal end, the proximal end having an opening configured to receive a distal end of an elongate handle;
   the distal end of the socket having a slot passing through the socket at two separate points along a perimeter of the socket;
   the slot configured to receive a proximal end of a blade;
   the blade having an upper surface and a bottom surface; and
   a foot step having platform for accommodating a person's foot;
   the platform located at the proximal end of the blade;
   the footstep also comprising a support integral with the platform;
   wherein the support contacts the bottom surface of the blade at a location distal from the proximal end of the blade to provide support to the blade and the platform;
   wherein the platform is integrated with the support via a curvilinear bottom section;
   wherein the platform has a planar surface relatively normal to a central axis of the socket or the blade;
   wherein the bottom surface of the blade is laterally convex to produce a depression in the upper surface; and
   wherein the support is cupped at its upper end to cradle the bottom surface of the blade.

6. A shovel as recited in claim 5, wherein the curvilinear bottom section is configured to generate leverage between the blade and the footstep when the blade is inserted into a region of soil.

7. A shovel as recited in claim 5 wherein the support is substantially parallel to the platform.

8. A shovel as recited in claim 5 wherein the distal end of the socket is configured to receive the proximal end of the blade at an angle with respect to the central axis of the socket.

9. A shovel as recited in claim 4, wherein the support is substantially parallel to the platform.

10. A shovel as recited in claim 4, wherein the platform extends laterally past the proximal end of the blade.

11. A shovel as recited in claim 4, wherein said slot emanates at a top region of the distal end of the socket such that a distal opening in the socket is predominantly adjacent to the bottom surface of the blade.

* * * * *